United States Patent [19]

Gleichechagen et al.

[11] 4,331,718

[45] May 25, 1982

[54] PROCESS FOR THE PRODUCTION OF ADHESIVE-REPELLENT COATINGS

[75] Inventors: Peter Gleichechagen; Günter Klaass, both of Hamburg, Fed. Rep. of Germany

[73] Assignee: Beiersdorf AG, Hamburg, Fed. Rep. of Germany

[21] Appl. No.: 262,996

[22] Filed: May 12, 1981

Related U.S. Application Data

[63] Continuation of Ser. No. 84,703, Oct. 15, 1979, abandoned.

[30] Foreign Application Priority Data

Oct. 19, 1978 [DE] Fed. Rep. of Germany ....... 2845541

[51] Int. Cl.³ ............................................. B05D 3/02
[52] U.S. Cl. .................................... 427/391; 427/208; 427/208.4
[58] Field of Search ...................... 427/391, 208, 208.4

[56] References Cited

PUBLICATIONS

Chemical Abstracts, vol. 56, pp. 6183-6184, Hoenig et al.
Chemical Abstracts, vol. 56, pp. 18509-18510, 26, 1959, Bartl.

Primary Examiner—Bernard D. Pianalto
Attorney, Agent, or Firm—Linda G. Bierman; Jordan B. Bierman

[57] ABSTRACT

A process for the production of adhesive-repellent coatings, particularly for the production of surface coatings on the backs of pressure sensitive tapes, comprising the radical emulsion polymerization products, in an aqueous alkaline medium, of a monomer mixture of maleic monoamides or maleic monoesters, styrene or its derivatives or a mixture of styrene or its derivatives with acrylic alkyl esters, plus optional cross linking monomers and polar monomers.

31 Claims, No Drawings

PROCESS FOR THE PRODUCTION OF ADHESIVE-REPELLENT COATINGS

This application is a continuation of and claims the benefit of the priority of U.S. Application Ser. No. 84,703, filed Oct. 15, 1979, abandoned, which, in turn, claims the priority of German Application No. P. 28 45 541.6, filed Oct. 19, 1978.

The present invention is directed to a process for the production of adhesive-repellent surface coatings using aqueous emulsions of copolymers resulting from radical emulsion-polymerization in the alkaline pH-range. The invention is particularly suitable for the manufacture of pressure sensitive self-adhesive tapes having a non adhesive varnish on the back.

Adhesive articles consist mostly of sheet-like substrate materials; such as foils of plastic or regenerated natural substances, papers, or woven or non-woven fabrics, which are provided on one or both sides with a pressure-sensitive coating. In order to prevent undesired premature sticking, the pressure-sensitive coating is frequently protected by a non-adhesive or repellent cover which must be removed before use. Sometimes the back of the substrate material itself serves as the cover when the article is stored; for example, in the case of rolls of pressure-sensitive tapes.

In order to prevent excessive adhesion of the cover to the pressure sensitive coating, the contact surface of the cover is normally coated with an adhesive-repellent agent. This permits storage of pressure-sensitive materials in stacks. Labels of this type can be easily detached from the cover before use and pressure-sensitive tapes wound in rolls require little effort for unrolling, regardless of the time and conditions of storage. Thus, in most cases, a defined residual adhesion is desired between the adhesive and the adhesive-repellent coating on the back. Unrolling forces, defined in accordance with a given repellent effect, permit the problem-free use of pressure-sensitive tape rolls in automatic unrolling devices and applicators. They also prevent the individual roll windings from sliding off when cut to length, and the roll from losing its shape, which happens frequently when the repellent effect of the back coat is too great. This also applies in a corresponding manner to pressure-sensitive labels. It is also of great importance that no substantial changes in the repellent effect should occur over a long period of time, even if the material was stored under unfavorable conditions, such as relatively high temperature.

In addition to the above-described properties, there are other requirements if the pressure-sensitive materials are to be used for protecting surface parts in varnishings, for other surface treatments, and the like. In varnishings, it is necessary that the back of the pressure-sensitive covering material provided with the adhesive repellent coat shows sufficient adhesion to the applied prime-, varnish- or paint coats, so that liquid or dried varnish or paint portions cannot drop from the covered areas on the freshly painted surfaces and soil them. Besides, the crepe papers provided with a pressure sensitive coat, which are preferably used for this special purpose, should have a surface strength which also resists minor abrasion for a short period. In particular, the adhesive-repellent coat should also strengthen and protect the paper against the influence of water.

If we consider that most of these individual requirements must also be met when using different pressure sensitive adhesive systems and substrate materials, it is understandable that an abundance of different repellent agents has already been suggested for coating pressure sensitive articles. Thus, shellac or cellulose derivatives, like nitrocellulose, acetyl cellulose or ethyl cellulose are recommended in U.S. Pat. No. 2,269,712 for coating the back of such tapes. U.S. Pat. No. 3,438,794 describes the use of carboxymethyl cellulose mixed with water-soluble salts of higher (long-chained) aliphatic sulfates. In other publications the use of soaps (U.S. Pat. No. 2,358,831) or of wax (U.S. Pat. No. 2,032,845) is suggested as the repellent agent. When these coating agents, like shellac or cellulose derivatives, are applied to the back of pressure sensitive adhesive tapes, they have the desired strengthening effect on the paper surface, due to their film-forming properties. However, they are not repellent agents in the proper sense, since they do not meet the requirements for such materials. Soaps and waxes, on the other hand, can have repellant effects, but they diffuse easily into the pressure-sensitive coat and can substantially impair its adhesive properties.

It is also possible to apply monomeric substances to the back surface of the paper and to polymerize them there to form a repellent coating. Known in this connection are the Werner chrome complexes of stearic acid, which are described for this purpose in U.S. Pat. No. 3,803,557.

Polymeric repellent agents of various kinds have also long been known. Thus copolymers of acrylic esters and acrylic acid and their use as adhesive-repellent coating agents to obtain surface coats of low adhesion are described in Germ. Pat. No. 872,621, where the ester radical consists of higher alkyl radicals with at least 12 C-atoms. Similar copolymers from analogous methacrylic esters and acrylonitrile are the subject of DAS No. 1,594,057. From DAS No. 1,300,852 is known a repellent for the back coating of adhesive masking tapes. This material consists of a tetrapolymer of a special composition whose principal component contains 51% octadecyl methacrylate, 9% acrylic acid, 29% acrylic nitrile, and 11% methyl methacrylate. In addition to these copolymers, which are synthetized from special acrylic esters, other polymers are known which are produced by copolymerization of olefins or vinyl esters with maleic anhydride, and which can be used as such or after a polymer-analogous reaction of the anhydride groups. Thus, DAS No. 1,075,772 described copolymers which are obtained by radical solution polymerization from higher alkyl vinyl esters or ethers with maleic acid or its monoesters or amides, and which can be used as an adhesive repellent in pressure-sensitive tapes. U.S. Pat. No. 4,029,843 describes the synthesis of a repellent agent which is obtained by polymeric reaction of copolymers from olefins (such as octadecene or hexene) and maleic anhydride with higher homologs of aliphatic alcohols; e.g. stearyl alcohol or corresponding amines.

In addition to these repellents produced by radical polymerization, they can also be produced by polyaddition; e.g. by the polymerization of long-chained diamines and/or diols to diisocyanates (U.S. Pat. No. 3,970,599), or by reacting an isocyanate-containing prepolymer with an amino-or hydroxyl group-containing organosilicone (U.S. Pat. No. 3,997,702). Finally, the silicones, which are frequently used repellents or separating agents should also be mentioned. They are described, for example, in U.S. Pat. No. 2,985,554. Fluorsiloxane compounds are also known as separating agents (DOS No. 1,594,908).

The above-described known agents are usually polymerized in solution or reacted like polymers and, with the exception of the silicones, used in the form of a solution in a volatile organic solvent for the production of adhesive-repellent coatings. In the patent literature, we find only sporadic indications that these organic solutions can also be emulsified in water and, after evaporating the organic solvents, be used as an aqueous emulsion for coating. The emulsions obtained with this procedure are relatively coarse, however, and require the addition of emulsifier for stabilization. Dense, continuous coatings cannot be obtained with them.

The adhesive-repellent coats used for the above described purposes are applied in a very thin layer (about 0.5 to 8 g/m$^2$ after drying) in order in affect the elasticity and flexibility of the substrate material as little as possible. Despite its thickness, however, the coat must be firmly anchored on the substrate so that no parts of its surface will be transferred to the pressure-sensitive adhesive coat on prolonged contact in the roll. For these reasons, the repellents are applied on the substrate material from highly diluted solutions, which frequently contain only 2 to 5% by weight thereof.

In order to avoid the use of high proportions of expensive solvents (and particularly in order to bypass the problems of recovering such solvents), it is desirable to use agents for the production of adhesive-repellent coatings in the form of aqueous dispersions or emulsions. In order to obtain high quality coatings, finely divided dispersions are required. Thus ensures a sufficiently high capillary pressure during drying so that the coat will adhere sufficiently to the substrate and a pore-free, continuous and cohesive film is formed. In order to also ensure a high resistance of the separation coating films to water, the amounts of stabilizing emulsifiers must be kept at a minimum, because even small amounts of emulsifier can greatly impair the adhesive properties of the adhesive coat by diffusing into the pressure-sensitive layer.

The present invention is therefore based on the problem of providing an aqueous, finely divided adhesive repellent dispersion which is preferably free of monomeric diffusable emulsifiers, which does not have the above-described drawbacks, and where pore-free, continuous, sufficiently cohesive films with good adhesive-repellent action are obtained for coating surfaces or web-type material, particularly the back of pressure-sensitive crepe papers.

It was found, and herein lies the solution to the problem, that this advantageous combination of properties can only be achieved if maleic monoamides or monoesters, whose hydrocarbon radicals have a chain length of 12 to 32 carbon atoms, are polymerized in certain quantitative ratios with certain co-monomers by radical emulsion-polymerization in the alkaline pH-range. The product obtained as an aqueous emulsion is then diluted with water to the desired consistency and applied on the substrate in a thin coat, and the coat thus obtained on the substrate is subsequently dried at a temperature above 100 deg. C.

The subject matter of the invention is thus a process for the production of adhesive-repellent coats on sheet- or web-type material, particularly for the production of surface coats on the back of pressure-sensitive tapes, which is characterized in that a copolymer is produced by radical emulsion-polymerization in the alkaline pH-range, preferably without the addition of foreign emulsifiers, from the following monomer mixture:

(a) 5 to 85% by weight, preferably 50 to 75% by weight (based on the total weight of the monomers) of one or more maleic monoamides or monoesters, whose hydrocarbon radical has a chain length of 12–32, preferably 14–18 C-atoms, as an effective repellent component, wherein the maleic monoamide (which is preferred), but if necessary the maleic monoester also, can be replaced by up to about 50% fumaric diesters.

(b) 15 to 95% by weight, preferably 25 to 50% by weight (based on the total weight of the monomers) of styrene, its derivatives, or a mixture of styrene or its derivative with acrylic acid alkyl ester. The proportion of this co-monomer must be so selected, depending on molecular weight, that at least an equimolar mixture of this co-monomer with the maleic- or fumaric derivatives is present.

(c) 0 to 20% by weight, preferably 2 to 8% by weight (based on the total weight of the monomers), of compounds with more than one polymerizable carbon double bond or of crosslinking monomers with reactive functional groups.

(d) 0 to 20% by weight, preferably 2 to 10% by weight (based on the total weight of the monomers) of polar monomers containing carboxyl groups.

This product, which is obtained as an aqueous emulsion, is diluted with water to a desired spreadable consistency, applied in a thin coat on the substrate, and the coat thus obtained is dried on the substrate at a temperature above 100° C.

The coating of the substrate, which can consist e.g. of a sheet of plastic or regenerated natural substance, of smooth or crepe paper, of a woven or non-woven fabric, is carried out so that after drying a continuous adhesive-repellent coating film is obtained. Drying is preferably effected in a heated drying device at 100° to 160° C., preferably at a temperature of 120° to 140° C. The coat thickness is usually 0.25 to 8 g/m$^2$, and preferably 2 to 6 g/m$^2$.

Copolymers of vinyl or acrylic compounds with higher homologs of the maleic monoamides or monoesters are already described in DAS No. 1,075,772 and in U.S. Pat. No. 3,342,625 as adhesive repellents. However, the solution polymerization disclosed there permits only the incorporation of 25 to 60% by weight of the effective monomers, due to the copolymerization parameters of these monomers with the co-monomers. The separation characteristics of these copolymers are based on the incorporation of side chains which, in general, includes from 14 to 18 (or more) carbon atoms). The greater the portion of these side chains in the copolymer, the more pronounced is the desired effect. Since these copolymers also contain free carboxyl groups in addition to the amide and/or ester functions, a firm hold on the substrate material is ensured.

It was found surprisingly that, in a radical emulsion-polymerization of these copolymers, far greater portions of the repellent maleic monoamides or monoesters or their mixtures can be polymerized than is possible by solution polymerization. The amount is limited only by the molecular weight ratio of the maleic acid derivatives and the co-monomer. A molar ratio of 1:1 should not be exceeded since maleic acid derivatives generally can not be radically homopolymerized.

In addition to the relatively rapid emulsion polymerization as compared with solution polymerization, another unforseen advantage is that the repellent monomeric maleic acid derivatives have, in the alkaline range, excellent ionic emulsifier properties. Therefore, the use of aids, such as emulsifiers and protective colloids, which is otherwise necessary in emulsion polymerization, can be avoided. Since the monomers acting as emulsifiers are incorporated in the polymer chains after polymerization, diffusion of components of the adhesive repellent coat into the adhesive coat does not occur. The use of copolymers according to the invention prevents such diffusion even when the tape coat is wound into rolls and the pressure-sensitive coat is in direct contact with the repellent coat for long periods of time under unfavorable conditions. It is of particular advantage if the polymerization takes place in an ammoniacal medium. The ammonium salts of maleic acid amides or esters acting as emulsifiers are destroyed when the paint films applied on the dry substrate give off ammonia, so that a practically or completely hydrophobic emulsifier-free repellent coat is obtained.

Another surprising advantage is the very small particle size of the polymeric adhesive-repellent dispersions or emulsions which can be obtained without difficulty with the method of the invention. The mean particle diameter can be in the range of $0.05\mu$, depending on the alkali content in the copolymerization of styrene with maleic monostearyl amide or ester and the minor additions of fumaric diesters, and hardly exceeds this range even with corresponding copolymers without the addition of fumaric diesters.

Since the size of the particles of the resulting polymer emulsion depends heavily upon the existing emulsifier concentration at the moment of the initiation of the polymerization, the size of the particles of the polymer emulsion can be regulated indirectly through the proportion of ammonia in the reaction mixture. If, for example, all of the existing carboxyl groups of the maleic acid monoamide or ester are changed completely through the influence of ammonia into the corresponding ammonia salts, so is the capacity of the emulsifier of the monomer mixture proportionately very high and the resulting polymer emulsion is consequently extremely fine. On the other hand, should approximately 60% of the carboxyl groups be neutralized, one gets a stable polymer emulsion having an average particle size which is significantly higher. A particle of this higher size might be desired for special uses; for example, when mixing with water-soluble film forming agent, a possible thin fluid separation system can be established.

Another important advantage of the process of the present invention is that it permits cross-linking during the polymerization by the additional use of cross-linking monomers, such as divinyl benzene. Such cross-linkages are not possible in solution-polymerization because of the gels formed there. In addition, the product of the radical emulsion-polymerization, obtained as an aqueous emulsion in the alkaline pH-range, can be easily diluted with water to provide the desired consistency which is particularly suitable for coating. It yields, after application and the subsequent drying, pre-free, continuous, water-proof adhesive repellent films of suitable cohesivity. The repellents known for application to substrates, on the other hand, are used in the form of highly diluted solutions in organic solvents, or in the form of aqueous dispersions produced from the precipitated solution polymer by the use of foreign emulsifiers. The former present difficult problems in recovery, especially when environmental considerations are taken into account. The latter do not yield the desired continuous hydrophobic repellent coatings, due to their relatively coarse-grained particles.

The starting materials for the production of the copolymers according to the invention are the maleic monoamides or maleic monoesters whose hydrocarbon radicals have a chain length of 12-32 preferably of 14-18 C-atoms and which form component (a) of the monomer mixture, as such or with each other. They are known compounds which can be obtained according to known methods by reacting maleic anhydride with higher saturated or unsaturated primary amines or alcohols with 12 to 32, preferably 14 to 18 C-atoms. Especially suitable are fatty amines and fatty alcohols.

Examples of suitable maleic monoamides and monoesters are maleic mono-(N-stearyl)-amide, maleic monostearyl ester, maleic monopalmityl ester and maleic monolauryl ester. The portion of these monomers in the monomer mixtures provided for polymerization can range from 5 to 85% by weight, depending on the molecular weight of the co-monomer. The maleic monoamide or the maleic monoester can be replaced by up to 50% of the amount used by diesters of fumaric acid. Examples of such fumaric diesters are fumaric dibutyl ester and fumaric distearyl ester.

As co-monomers [component b)], which are copolymerized with one or more compounds of component a) in the above indicated ratio, are used particularly styrene and its derivatives, such as methyl styrene. Esters of acrylic acid with straight-chained or branched monovalent, primary aliphatic alcohols with 1 to 3 or 14 to 20 carbon atoms (lower and higher acrylic alkyl esters) or their mixtures can be used in small amounts. Vinyl esters, like vinyl acetate, and/or vinyl ethers, like vinylethyl ether, can likewise be used as co-monomers for copolymerization with the compounds of component (a), but they yield copolymers which are less suitable for the purpose of the invention. It is of paramount importance to select the portion of the above-mentioned co-monomers so that, depending on their molecular weight, the monomer mixture provided for the polymerization contains at least an equimolar mixture of these co-monomers with the maleic acid and fumaric acid derivatives.

In addition to the above-described monomers, the monomer mixture provided for the polymerization can contain up to 20% by weight (based on the total weight of the monomers), and preferably 2 to 8% by weight, of cross-linking monomers. Suitable are compounds which contain more than one polymerizable carbon-double bond, such as divinyl benzene, 1,4-butanediol diacrylate, 1,6-hexanodiol-diacrylate or trimethylolpropane-trimethacrylate, or compounds which contain reactive functional groups, such as N-methylolacryl amide. The addition of compounds of the latter type results in interparticular cross linkage during the film formation, in addition to the intraparticular cross linkage.

In order to strengthen the anchorage of the adhesive repellent coat on polar substrate materials, the monomer mixture provided for the polymerization can contain up to 20% by weight, preferably 2 to 10% by weight (based on the total weight of the monomers), of polar monomers containing carboxyl groups, such as acrylic acid, methacrylic acid, crotonic acid or itaconic acid.

The polyermization is effected according to the known methods of emulsion-polymerization in deionized water at about 75° C. For economic reasons, suitable polymer emulsions of the type according to the invention can also be obtained with regular tap water with a lesser particle increase. After the atmospheric oxygen has been displaced and the monomer mixture has been homogenized in the water phase, the polymerization is at a pH value of 8 to 11, preferably 8 to 9, by adding a water soluble radical former, preferably ammonium peroxide disulfate. In order to avoid foaming, a defoaming agent can be used. The use of stabilizers is generally not required.

The solids content of the emulsion can vary within relatively wide limits, although it is preferably between 5 and 30% by weight. Soids concentrations of up to about 65% by weight are possible, but the resulting higher viscosity may render processing more difficult. If higher polymer concentrations between 25 and about 40% by weight are desired, and if a slight reduction of the repellent effect of the adhesive-repellent coats produced therewith is acceptable, the portion of higher maleic monoesters or amides in the monomer mixture can be replaced by maleic monoesters or monoamides with a somewhat lower number of carbon atoms in the alkyl radical. For example, maleic monostearyl ester or amide by maleic monolauryl ester or amide. The better emulsifying action of these low homologs influences the viscosity and fineness of the polymer emulsion formed in a positive sense.

The aqueous emulsion produced according to the invention can be used for many purposes, particularly after mixing with polymeric film-formers. When used for the production of adhesive-repellent back coatings in pressure-sensitive crepe paper masking tapes, they fully meet the requirements for varnishing in the automobile industry or in other surface treatment processes. In cases in which, in addition to the repellent effect, a strengthening of the paper surface and suitable waterproofness is also desired, the aqueous emulsions of the present invention can be mixed with water-soluble filmformers; e.g. formaldehyde/urea condensation products, or with aqueous polymer latices; e.g. polyvinylidene chloride emulsions, before they are used for coating. The portion of these additives in the adhesive repellent coat can range from 5 to 95% by weight, preferably 50 to 85% by weight, based on the solid portions.

The process according to the invention will now be described in greater detail based on the following illustrative examples.

EXAMPLE 1

A 20 liter polymerization apparatus made of V2A-steel is equipped with an anchor agitator, a reflux condenser, a thermometer and a gas inlet tube. 2250 g (75% by weight based on the total weight of the monomers) of maleic mono (N-stearyl) amide is stirred in 11130 g of deionized water to form a coarse dispersion. Nitrogen is introduced to displace the air in the apparatus. Then 750 ml of a 25% aqueous ammonia solution are added to the dispersion. With slow stirring, the dispersion is heated within a period of 45 minutes to 65° C. From the initial coarse dispersion, an extremely finely divided colloidal distribution of the maleic monostearylamide is obtained.

After the addition of 720 g (25% by weight based on the total weight of the monomers) of styrene and further heating to 71° C., the polymerization is initiated by the addition with slow stirring of 15 ml of a 10% aqueous ammonium peroxide disulfate solution. At intervals of 15 minutes, additional amounts of initiator solution are added to a total of 100 ml. The temperature rises to about 80° C. After 8 hours the polymerization is completed. The content of copolymer in the finely divided, thinly liquid dispersion thus formed is 20% by weight and the pH value is between 9 and 10.

(a) The aqueous dispersion of the adhesive repellent copolymer thus produced is applied without further dilution with water by means of a conventional applicator on a polyethylene terephthalate sheet in such a thin coat that a waterproof, pore-free, continuous coating of a thickness of 3.8 g/m$^2$ is formed after drying at 120°–140° C., with a good adhesive-repellent action against pressure-sensitive compounds of various kinds.

(b) An impregnated flexible crepe paper is coated on one side with an aqueous polyvinylidene chloride emulsion, so that a back coat with a thickness of 7 g/m$^2$ is obtained after drying. On this coat is then applied the adhesive repellent emulsion of Example 1 (coat thickness after drying: 4 g/m$^2$) and, on the opposite side of the crepe paper substrate, a pressure-sensitive coat of a copolymer of 49 weight % ethylhexyl acrylate, 49 weight % n-butylacrylate, and 2 weight % glycidyl methacrylate (coat thickness after drying: about 30 g/m$^2$) is applied. The pressure-sensitive tapes thus obtained, which are wound in rolls, show greatly reduced unrolling strength under constant conditions, as compared with rolls which are produced without a repellent coat on the back.

The thickness of the dried repellent coat can range from 0.5 to 8 g/m$^2$, depending on the amount and type of pressure-sensitive compounds applied subsequently on the uncoated side of the substrate. The pressure-sensitive compound can consist of polyacrylic ester homo or copolymers, rubber-resin systems or other known pressure-sensitive polymers; such as polyvinylalkyl ethers or polyisobutylene, with or without the addition of plasticizers. The amount applied (in the dry state) can vary between 10 and 120 g/m$^2$, depending on the type of the selected composition and special uses of the adhesive tape. With large quantities and particularly with very soft pressure-sensitive compounds, even stronger repellent films can be used.

(c) The separation emulsion of Example 1 is diluted with deionized water to a polymer content of approximately 10% by weight. In this emulsion a water soluble formaldehyde/urea condensate is added while stirring at an alkaline pH value of between 8 and 10, so that the resulting mixture contains approximately 50 weight percent of polymer mixture.

The polymer mixture consists of 15% by weight adhesive repellent copolymer and 85% by weight of the formaldehyde urea polycondensate. This mixture is applied on one side of the impregnated crepe paper described under (b) hereof (coat thickness after drying: about 8 g/m$^2$). As a pressure sensitive compound for coating the untreated opposite side of the crepe paper, there is applied a rubber-resin adhesive compound of 40 parts by weight natural rubber (air dried) and 60 parts by weight of a mixture of equal parts of polyterpene resin and ester resin, which contains minor additions of zinc oxide and age-resistors [e.g. 2,2-methylene-bis-(4-methyl-6-t-butyl phenol) or 2'-mercaptobenzimidazol]. The coat thickness after drying is 70 g/m$^2$. The crepe paper adhesives thus produced and wound on rolls are suitable as masking materials for surface finishings of metals; e.g. priming and lacquering.

(d) A raw crepe paper with a weight of 50 g/m$^2$ is impregnated with a styrene-butadiene latex which contained 35% styrene. It was then dried (impregnating agent content: 30 g/m$^2$). One side is coated with a preliminary coat of filler-containing rubber solution as a bonding aid for the pressure-sensitive coat to be applied later. The back of the paper substrate is then coated with the mixture of repellent copolymer and urea-formaldehyde condensate described under (c) in an amount such that a coat of 7 g/m² is obtained after drying at 120 to 140 deg C. The substrate finished this way is subsequently coated on the opposite side with a pressure-sensitive compound dissolved in benzine. The compound consists of natural rubber and a mixture of hydrocarbon resin and pinene resins (the basic components being in a weight ratio of 40:60), 10% zinc oxide as a filler, and a small amount (1%) of an age-resistor (2,5-di-t-amyl hydroquinone), which is heated briefly to 150° to 160° C. for drying and cross-linking (amount applied in the dry state: 60 g/m²). The bales were cut and made to handy rolls. These can be used with advantage, for example, as oven-proof masking tapes for automobile lacquering plants.

The unrolling characteristics of the crepe paper rolls is clearly improved by the above described repellent coating according to the invention. With an adhesive strength of the pressure-sensitive rubber resin compound of 4.0 to 5.0 N/cm, measured on steel, a strength of 1.8 to 3.0 N/cm is required for unrolling from the roll when using known repellent compositions for back coating, but only 0.6 to 1.5 N/cm when using the above described misture. Each is measured at an unrolling speed of 0.3 m/min, which clearly shows the superiority of the adhesive-repellent coats according to the invention.

EXAMPLE 2

In a 2-liter polymerization chamber of glass, which was equipped as described in Example 1, 247.2 g maleic mono-(N-stearyl)-amide (61.8% by weight based on the total weight of the monomers) are dispersed in 800 ml deionized water. After displacement of the air by nitrogen as in Example 1, followed by the addition of 100 ml of a 25% aqueous ammonia solution, a finely divided colloidal dispersion is formed. This dispersion is mixed with 100 g styrene (25% by weight, based on the total weight of the monomers), 40 g divinyl benzene (10% by weight based on the total weight of the monomers) and 12.8 g N-methylolacrylic amide (3.2% by weight based on the total weight of the monomers). After heating to 70° C., the polymerization is initiated by the addition of 2.5 ml of a 10% aqueous ammonium peroxide disulfate solution. After 30 minutes, an additional 2.5 ml of the initiator solution is added.

Within a reaction time of an additional 60 minutes, the viscosity increases greatly. The reaction mixture is then diluted with 680 ml deionized water and again mixed with 10 ml of the initiator solution. The polymerization temperature is set at 68° to 70° C. After a total reaction time of 8 hours, the reaction is completed. The content of copolymer in the finely divided dispersion or emulsion obtained is 21% by weight and the pH value is between 9 and 10. The emulsion is free of gel specks and contains only a few foam bubbles. When used as described in examples (1a) to (d), pore-free, continuous, thin films with excellent adhesive repellent properties are obtained in each case after drying.

EXAMPLE 3

In a 2-liter glass apparatus, which was equipped as described in Example 1, 130 g maleic mono-(N-stearyl)-amide (65% by weight, based on the total weight of the monomers) are dispersed in 800 ml deionized water.

Subsequently the air in the apparatus is displaced by the introduction of nitrogen. By addiing 60 ml of a 25% aqueous ammonia solution, we obtain a highly viscous finely divided dispersion. Under slight heating and stirring, 50 g styrene (25% by weight based on the total weight of the monomers) are gradually added to 20 g acrylic acid 2-hydroxy-propyl ester (10% by weight based on the total weight of the monomers). The polymerization is initiated at 73° C. by the addition of 2 ml of a 10% aqueous ammonium peroxy disulfate solution. The temperature rises within 7 minutes to about 80° C. and then drops gradually to 76° C. At intervals of about 10 to 15 minutes, are added 2 ml initiator solution, a total of 8 ml. The reaction time is 6 hours. The reaction temperature is 75° C. to 77° C.

The thin liquid polymer emulsion obtained was free of gel specks and could be processed directly or in mixed form; as described in the preceding examples. Pore-free, continuous, thin film coats with excellent adhesive-repellent properties were obtained on various types of substrate materials.

EXAMPLE 4

In the glass apparatus described in Examples 2 and 3, 137 g maleic mono-stearyl ester (68.5% by weight based on the total weight of the monomers) are dispersed in 800 g deionized water. After displacing the air by passing nitrogen through the apparatus, 60 ml of a 25% aqueous ammonia solution are added. Subsequently, the reaction material is heated under stirring to 72° C.

After gradually adding 50 g styrene (25% by weight based on the total weight of the monomers), 12 g divinyl benzene (6% by weight, based on the total weight of the monomers) and 1.02 g N-methylolacrylic amide (0.5% by weight based on the total weight of the monomrs), the polymerization is initiated by the addition of 2 ml of a 10% aqueous ammonium peroxy disulfate solution at 76° C. At intervals of about 10 minutes, 2 ml are added, a total of 8 ml. The reaction temperature was 75° to 77° C.

After a reaction time of 6 hours, the polymerization was completed. The polymer-emulsion obtained was a thin liquid and free of foam and gel specks. It could be processed as described in Example 1.

EXAMPLE 5

As described in Example 4, 146 g maleic mono-(N-stearyl)-amide (73% by weight based on the total weight of the monomers), 50 g styrene (25% by weight based on the total weight of the monomers) and 4 g butanediol-diacrylate (2% by weight based on the total weight of the monomers) are polymerized in 800 g deionized water to form a repellent emulsion by adding 60 ml of a 25% ammonia solution and a total of 8 ml of a 10% aqueous ammonium peroxy disulfate solution.

The thin liquid, very finely divided emulsion obtained was free of gel specks, and could be processed as described in Example 1 under (a) to (d).

EXAMPLE 6

In a 2 liter glass apparatus, which was equipped as described in Example 1, are dispersed 148.5 g (67.5% by weight based on the total weight of the monomers) of maleic monostearyl ester and 16.5 g (7.5% by weight based on the total weight of the monomers) of maleic monolauryl ester in 708 ml deionized water with the addition of 70 ml 25% aqueous ammonia solution. Subsequently, 55 g (25% related to the total weight of the monomers) of styrene are added. After displacing the air in the apparatus by nitrogen and heating to 78° C., the reaction was initiated and carried out as described in the preceding examples. The polymer emulsion obtained is finer than the adhesive repellent emulsion described in Example 4. The separating action, however, of the adhesive repellent coats produced with them is slightly lower.

EXAMPLE 7

In a 2 liter glass apparatus, which was equipped as described in Example 1, 158.6 g (72.1% by weight based on the total weight of the monomers) of maleic mono-(N-stearyl)-amide are dissolved in 689 ml deionized water. 85 ml of a 25% aqueous ammonia solution are added at 78° C. After replacing the air in the apparatus by nitrogen and adding 61.4 g (27.9% by weight based on the total weight of the monomers) of styrene, the reaction is initiated and polymerization carried out as described in the preceding examples. The polymer emulsion obtained was very finely divided. The film coats produced therefrom, however, showed a much reduced separating effect as compared with the corresponding polymer emulsions produced according to examples 1 to 5.

EXAMPLE 8

100 g (50% by weight based on the total weight of the monomers) of maleic -mono-(N-stearyl)-amide, 80 g (40% by weight based on the total weight of the monomers) of styrene and 20 g (10% by weight based on the total weight of the monomers) of crotonic acid are stirred into 718 ml deionized water in a 2 liter glass polymerization apparatus which was equipped as described in example 1. 80 ml of a 25% ammonia solution are added to form a finely divided emulsion. Polymerization is carried out as described in the preceding examples. A finely divided polymer solution was obtained which, when processed in the manner described in Example 1 (a) to (d), yielded pore-free, continuous films which, in addition to a good adhesive-repellent effect, showed good adhesion on polar substrates.

EXAMPLE 9

In a 100 liter polymerization apparatus (V2A steel), equipped as described in Example 1, are suspended 7.5 kg (50% by weight based on the total weight of the monomers) of maleic mono-(N-stearyl)-amide in 57.52 kg deionized water heated to 75° C. Subsequently, the air in the apparatus is replaced by nitrogen. After adding 1.73 kg of a 25% aqueous ammonia solution, the mixture is stirred to a homogenous emulsion. The amount of ammonia added suffices for the formation of the ammonium salt from 60% of the charged maleic mono-(N-stearyl)-amide. Then 7.5 kg (50% by weight based on the total weight of the monomers) of styrene is added, and the polymerization initiated at 75° C. with 150 ml of a 10% aqueous ammonium-peroxy disulfate solution. The reaction temperature is maintained by temperature control between 75° and 85° C. Additional amounts of initiator (750 ml of solution) are added at intervals of about ½ to 2 hours. The polymerization is completed after 12 hours. A stable, milk-white repellent emulsion is obtained, whose average particle diameter is clearly above the corresponding values of the emulsion obtained according to Example 1. By using this emulsion, we obtained in every case after drying pore-free, continuous thin film coats with excellent adhesive-repellent properties.

EXAMPLE 10

In a 2 liter polymerization apparatus of glass which is equipped as described in Example 1, 224.8 g (56.2% by weight (based on the total weight of the monomers) of maleic-mono-(N-stearyl)-amide is dispersed in 800 ml deionized water at 75° C. Subsequently, after displacing the air by nitrogen, 100 ml of a 25% aqueous ammonia solution are added. Into the emulsion formed are stirred 100 g (25% based on the total weight of the monomers) of styrene, 32 g (8% by weight based on the total weight of the monomers) of divinyl benzene, 40 g (10% by weight based on the total weight of the monomers) of dibutyl-fumarate, and 3.2 g (0.8% by weight based on the total weight of the monomers) of N-methylolacrylamide. The polymerization is initiated at 75° C. with 2.5 ml of a 10% aqueous ammonium peroxy disulfate solution. The reaction was carried out at 78° to 80° C., the reaction time was 10 hours. The polymer emulsion obtained was finely divided and free of gel specks and yielded film coats with excellent repellent action.

We claim:

1. A process for the production of adhesive repellent coatings comprising producing a copolymer by radical emulsion-polymerization under alkaline conditions in an aqueous medium of monomers comprising
   (a) 5% to 85% by weight, based on total weight of said monomers, of at least one compound of maleic monoamide or maleic monoester, said compound having a hydrocarbon radicals of 12 to 32 carbon atoms, wherein up to about 50% of said compounds may be replaced by fumaric esters,
   (b) 15% to 95% by weight, based on total weight of said monomers, of a substance taken from the class consisting of styrene, styrene derivatives, and a mixture of said styrene or said styrene derivatives with an acrylic alkyl ester, said substance being present in an amount at least equimolar with (a),
   (c) 0 to 20% by weight, based on total weight of said monomers, of at least one cross linking agent having a plurality of polymerizable carbon double bonds, or having reactive functional groups,
   (d) 0 to 20% by weight, based on total weight of said monomers, of polar materials having at least one carboxyl group, whereby an aqueous emulsion having a solids content is produced, applying said emulsion to a substrate to form a coating, and drying said coating at a temperature of at least 100° C.

2. The process of claim 1 wherein said polymerization takes place in the presence of an ammoniacal medium.

3. The process of claim 1 wherein said solids content is 5% to 40% by weight.

4. The process of claim 3 wherein said solids content is 5% to 30%.

5. The process of claim 2 wherein (b) is present in an amount of 25% to 50% by weight based on said monomers.

6. The process of claim 2 wherein (c) is present in an amount of 2% to 8% by weight based on said monomers.

7. The process of claim 2 wherein (d) is present in an amount of 2% to 10% by weight based on said monomers.

8. The process of claim 2 wherein said aqueous emulsion is diluted to spreadable consistency before applying.

9. The process of claim 2 wherein said emulsion is applied in a thin layer.

10. The process of claim 2 wherein said emulsion comprises 5% to 95% by weight, based on said solids content, of said copolymer and 95% to 5% by weight, based on said solids content, of a water soluble film former or an aqueous polymer latex.

11. The process of claim 2 wherein said emulsion is 15% to 50%, by weight, based on said solids content, of said copolymer and 85% to 50% by weight, based on said solids content, of said film-former or said latex.

12. The process of claim 2 wherein coating, after drying, 0.25 to 8.0 g/m².

13. The process of claim 2 wherein said temperature is 100° to 160° C.

14. The process of claim 13 wherein said temperature is 100° to 140° C.

15. The process of claim 2 wherein said substrate is crepe paper masking tape.

16. The process of claim 2 wherein said styrene derivatives are alkyl styrenes.

17. The process of claim 16 wherein said derivative is methyl styrene.

18. The process of claim 2 wherein said acrylic alkyl ester is an ester of acrylic acid with straight or branched chain, monovalent, primary, aliphatic alcohols having 1 to 3 or 14 to 20 carbon atoms.

19. The process of claim 2 wherein (b) is a vinyl ester or a vinyl ether.

20. The process of claim 19 wherein (b) is vinyl acetate or vinyl ethyl ether.

21. The process of claim 2 wherein said cross-linking agent is divinyl benzene; 1,4 butanedioldiacrylate; 1,6 hexane-dioldiacrylate, trimethylolpropane-trimethacrylate, or N-methylolacrylamide.

22. The process of claim 2 wherein said polar materials are acrylic acid, methacrylic acid, crotonic acid or itaconic acid.

23. The process of claim 2 wherein said aqueous medium is deionized water.

24. The process of claim 2 wherein said polymerization is carried out under an inert atmosphere.

25. The process of claim 24 wherein atmosphere oxygen is displaced by nitrogen.

26. The process of claim 2 wherein said polymerization is carried out at a pH of 8 to 11.

27. The process of claim 26 wherein said pH is 8 to 9.

28. The process of claim 2 wherein (a) is present in an amount of 50% to 75% by weight, based on said monomers.

29. The process of claim 2 wherein said hydrocarbon radical has 14 to 18 carbon atoms.

30. The process of claim 2 wherein said monomer is maleic monoamide.

31. The process of claim 1 wherein said coatings are substantially free from monomeric diffusible emulsifiers.

* * * * *